W. M. THOMAS.
REELING APPARATUS FOR MOVING PICTURE CAMERAS.
APPLICATION FILED DEC. 28, 1914.
1,244,918.
Patented Oct. 30, 1917.
5 SHEETS—SHEET 1.
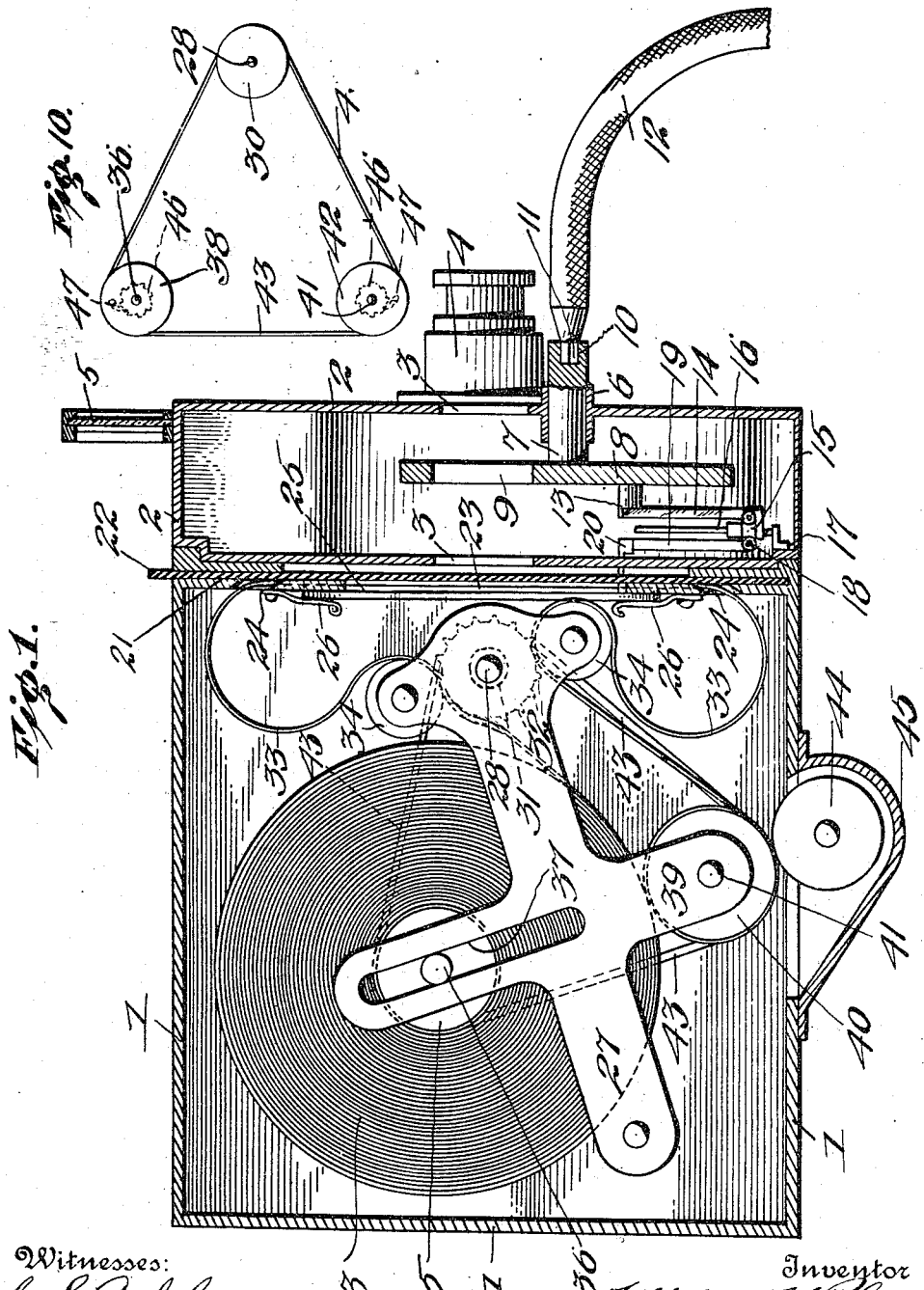
Witnesses:
C. S. Ashley
N. J. Llewellyn
Inventor
William M. Thomas
By his Attorney
Robert W. Ashley W. M. THOMAS.
REELING APPARATUS FOR MOVING PICTURE CAMERAS.
APPLICATION FILED DEC. 28, 1914.
1,244,918.
Patented Oct. 30, 1917.
5 SHEETS—SHEET 2.
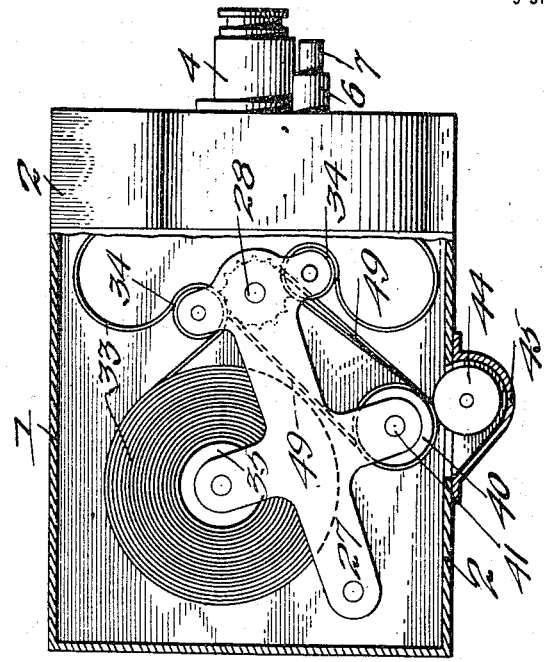
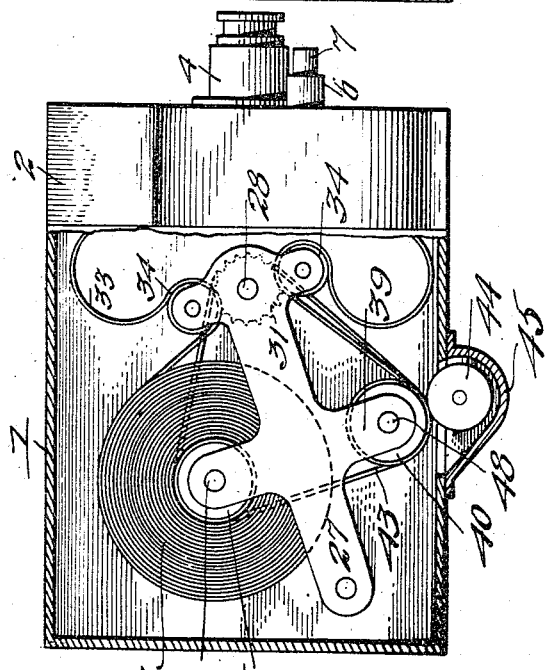
Witnesses
C. S. Ashley
W. Llewellyn
Inventor
William M. Thomas
By his Attorney
Robert W. Ashley

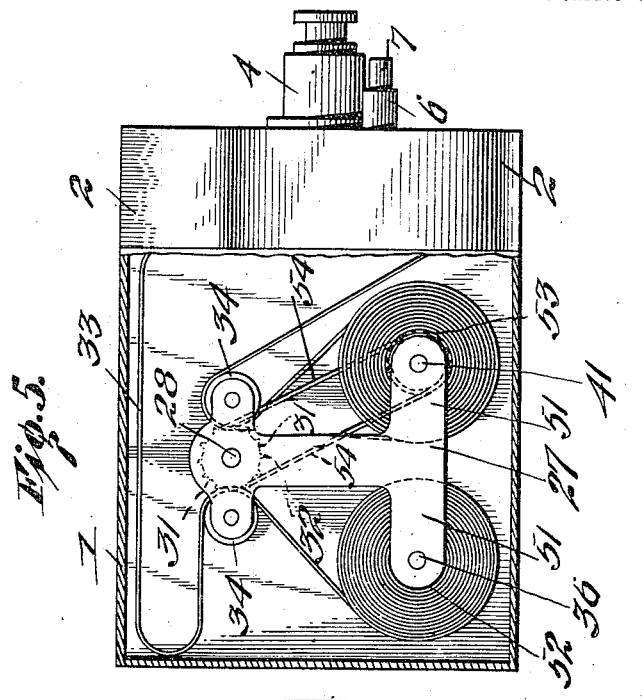

W. M. THOMAS.
REELING APPARATUS FOR MOVING PICTURE CAMERAS.
APPLICATION FILED DEC. 28, 1914.
1,244,918.
Patented Oct. 30, 1917.
5 SHEETS—SHEET 4.
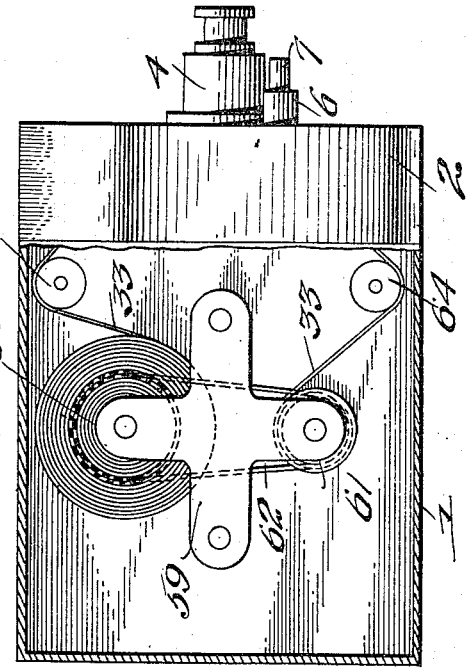
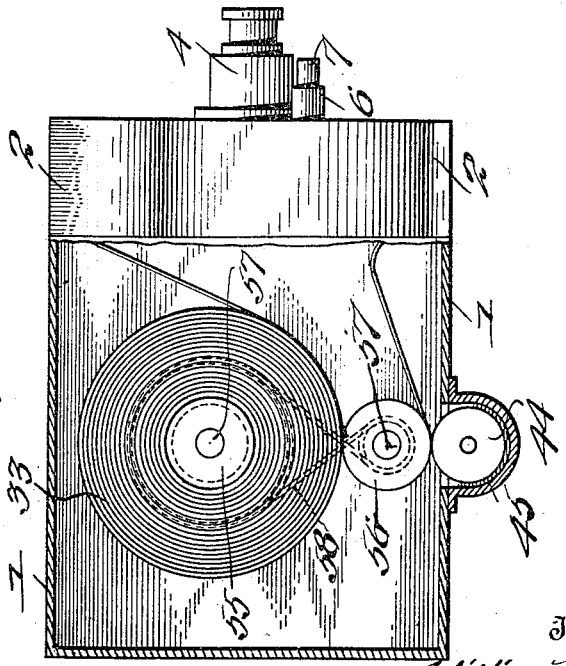

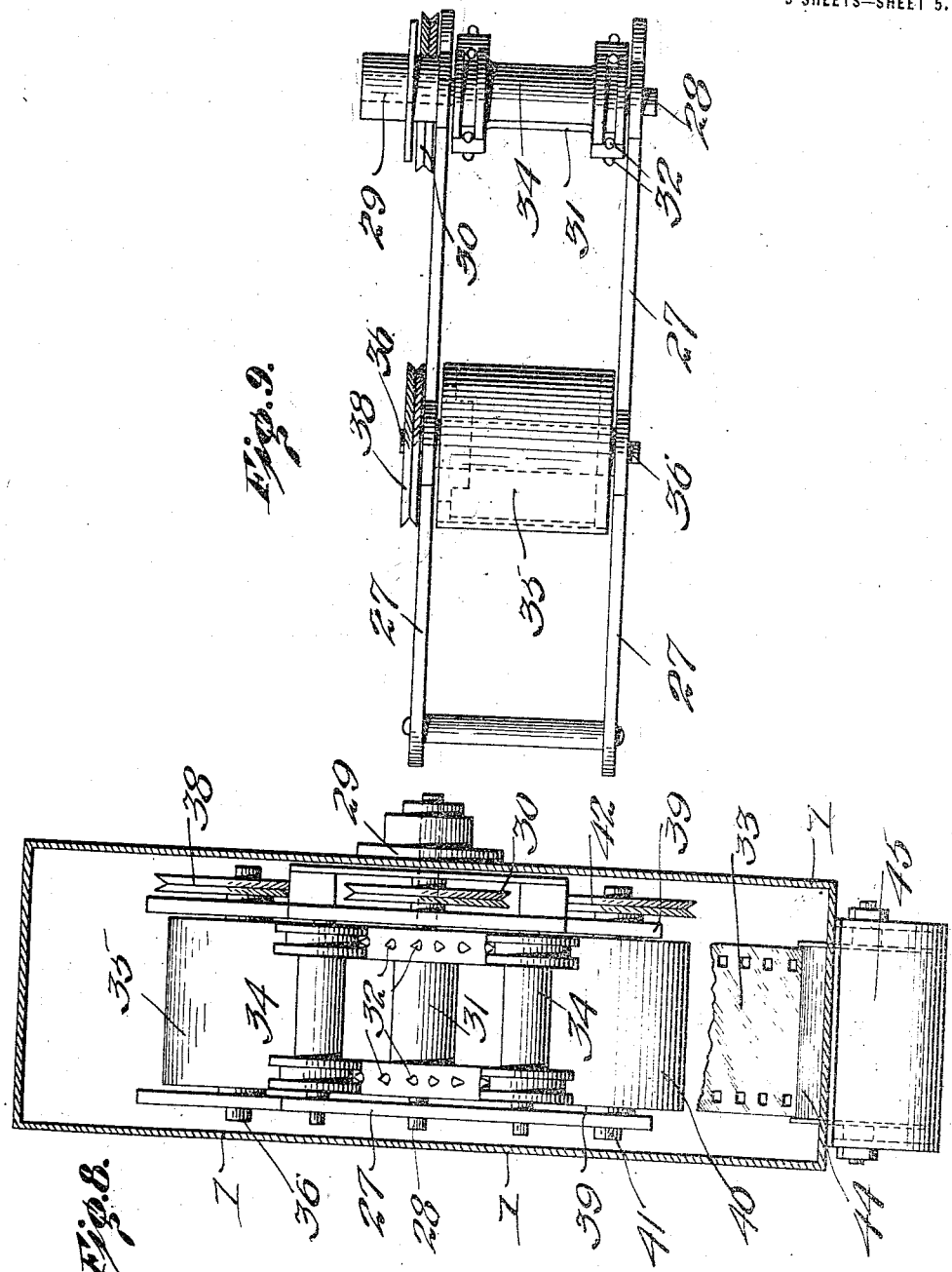

UNITED STATES PATENT OFFICE.

WILLIAM M. THOMAS, OF NEW YORK, N. Y., ASSIGNOR TO THOMAS-OBERKIRCH COMPANY, LIMITED, OF NEW YORK, N. Y., A CORPORATION OF NEW YORK.

REELING APPARATUS FOR MOVING-PICTURE CAMERAS.

1,244,918.

Specification of Letters Patent. Patented Oct. 30, 1917.

Application filed December 28, 1914. Serial No. 879,342.

*To all whom it may concern:*

Be it known that I, WILLIAM M. THOMAS, a citizen of the United States, residing at New York city, in the county of New York and State of New York, have invented new and useful Improvements in Reeling Apparatus for Moving-Picture Cameras, of which the following is a specification.

The invention relates to improvements in film reeling apparatus for moving picture cameras and has particular reference to film magazine having mounted therein a movable frame, carrying a series of film reception spools adapted to receive the standard film reels, said frame and spools being so arranged relative to one another that the winding and unwinding of a film thereon displaces substantially the entire area of the magazine, and during such winding and unwinding, from one spool to another, displace the area of space taken up by the original position of the film wound on the inserted reel.

By utilizing a film winding and unwinding means, such as disclosed, a moving picture machine is obtained of approximately (one quarter) the size and weight of any heretofore known type of machine, and provides a device for taking moving pictures as well as still pictures (both instantaneous and time exposures) that is as readily portable as the present well known type of hand kodak or hand camera. A suitable mechanism or actuating means to take moving pictures forms part of the device as a whole, and is arranged to be driven or actuated at a point distant from the camera magazines such as a flexible rotatable shaft, manually controlled by an operator of the device, providing a moving picture actuating means requiring the attention of only a single and inexperienced operator.

In the following is described in connection with the accompanying drawings one embodiment of the invention the features thereof being more particularly pointed out hereinafter in the claims.

In the drawings Figure 1 is a longitudinal sectional view of the reel containing magazine, illustrating in connection therewith an auxiliary compartment or magazine attached thereto, containing suitable mechanism for taking moving pictures, and means for actuating the same, the frame carrying the winding and unwinding spools being provided with means adapted to permit of the movement of both said frame and one of said spools in said frame, and the driving of both of said spools from the feeding rolls, the position and tension of the film as moved by said feeding rolls being maintained by a pair of compensating rolls, the film on said spools being in frictional engagement with each other during the winding and unwinding thereof; Fig. 2 is a longitudinal sectional view of the film magazine and the camera mechanism magazine in elevation, illustrating the frame as movable on its pivotal support, and showing the spools stationary in said frame, said spools being driven from the film feeding roll, the film on said spools being disengaged from one another; Fig. 3 is a longitudinal sectional view of the film magazine and an elevation of the camera mechanism, the frame in said magazine being movable on its pivotal support, and the film spool stationary therein, one of said spools being driven from the film feeding rolls; Fig. 4 is a longitudinal sectional view of the film magazine and an elevation of the camera mechanism casing, the spool supporting frame being movable in its magazine on its pivotal support, said frame having means formed therein permitting the movement of one of the winding spools, the other spool which engages said aforesaid spool being stationary and engaging an idler spool, which latter spool is driven by the film feeding roll; Fig. 5 is a longitudinal sectional view of the film magazine and elevation of the camera mechanism and lens, said film magazine having mounted therein and swinging pendant from its pivotal support a frame having mounted in its lower portion stationary spools, one of said spools being driven from the film feeding roll, the position of said spools being so arranged that during the unwinding and winding thereof they do not contact one another; Fig. 6 is a longitudinal sectional view of the film magazine and elevation of the camera compartment, showing the application in said film compartment of two stationary spools and an idler spool, the unwinding and winding spools being in frictional contact with one another and assisted in their rotation by means of a belt drive from one spool to another; Fig. 7 is a modified type of film magazine showing two stationary spools mounted on a stationary frame, said spools having mounted thereon pulleys driven from one to the other; Fig. 8 is a vertical cross sectional view of the film magazine, showing the relative position therein of the swinging frame movable on its pivotal support, carrying the winding and unwinding spools, and film driving rolls and compensating rolls, together with the pulleys on the spindles or shafts of said spools, and the connecting spindle end for receiving a connection from the camera mechanism for actuating all of said spools; Fig. 9 is a plan view of the spool supporting frame; and Fig. 10 is an elevation of the spool driving pulleys and the pawl and ratchet control for the pulleys on the winding and unwinding spools.

Similar numerals of reference indicate similar parts throughout the several views.

In the drawings (1) designates a film magazine or compartment which may be made of any suitable material applicable therefor, having suitably attached thereto an auxiliary casing or compartment (2) provided at its center with openings (3), and having mounted on the face thereof, in alinement with said openings (3) a lens (4), and on the top a sight glass (5) for focusing an object to be taken. (6) indicates a bearing on the face of compartment (2) and has mounted therein a shaft (7) having mounted on the inside end thereof a wheel or rotating shutter (8) having cut therein an aperture (9), adapted to travel across the visional line of the openings (3) when rotated, said shaft (7) has also cut in the outer end a square hole (10) adapted to receive a correspondingly shafted head (11) on the end of a flexible shaft (12) which may be covered in any suitable manner, said flexible shaft being actuated to rotate said shutter by any suitable means. Said wheel (8) has mounted therein in an eccentric position a stud (13) having mounted therein one end of a spring (14) the other end thereof being mounted in sliding and rocking head (15) operative vertically on guide rods (16) mounted in brackets (17) on compartment (2), said head (15) having pivotally mounted therein at (18) arms (19) provided at their upper ends with claws (20) adapted to engage the feed holes on the side of a film. Magazine (1) and compartment (2) are preferably hinged together and said magazine (1) has cut therein a slot (21) adapted to receive a blind slide or shutter (22) for keeping out the light or preventing the film from being light struck during the idle position of the camera or the discharging and charging of the film magazine. The front wall of magazine (1) has cut therein an aperture (23) and slots (24) over and through which the film passes and immediately adjacent said aperture a pressure plate (25) controlled by springs (26) for pressing the film against the back wall of compartment (2) permitting claws (20) to engage the holes in said film and feed same when actuated.

(27) designates a supporting frame pivotally mounted on shaft (28) which is mounted in a bearing (29) fastened in the side wall of magazine (1), the outer end of said shaft (28) having means mounted thereon adapted to receive the end of a flexible shaft driven from the connection forming part of the driving means for shutter or gyroscopic wheel (8), and said shaft (28) has mounted thereon a pulley (30) and a feed roll (31) provided with teeth (32) adapted to engage and assist in feeding a film (33). Frame (27) has mounted thereon above and beneath feed roll (31) compensating rolls (34) adapted to place a torc on said film (33) and press same into engagement with roll (31) and at the same time take up any unnecessary slack or lost motion in said film, and to further assist the free and easy movement of the film (33) from the feeding or unwinding spool (35) carrying the body of the film, said spool (35) has mounted therein studs (36) operative and movable vertically in slots (37) in said frame (27), one of said studs (36) having mounted thereon a pulley (38). The depending arm (39) of frame (27) has mounted therein a winding or receiving spool (40) adapted to engage the periphery of the body of film (33) on spool (35) and has also mounted on one of the studs (41) a pulley (42), all of said pulleys 30—38 and 42 having mounted thereon a flexible tension belt (43) for assisting in the unwinding and winding of the film (33), the friction caused by reason of the engagement of the body of the film roll and the winding of said film on said spool (40) which engages an idler spool (44) mounted in a depending casing (45) and attached to magazine (1), together with the weight of the pivoted frame (27), permits of the steadying movement of the film during the course of taking a series of pictures over the series of rolls and spools, and provides a film winding and unwinding means within a small or limited space wherein the same area taken up by the initial or unused film roll is displaced by the winding up of said film after a series of pictures have been projected thereon. Pulleys (38) and (42) have associated therewith ratchets (46) adapted to be engaged by pawls (47) for holding the film under tension on the unwinding and winding spools (35) and (40) when the operative parts of the camera are idle.

In Fig. 2 of the drawings the frame (27) is pivoted on shaft (28) but spools (35) and (40) are both rigid on studs (48), the centers of which are set at greater distances apart to permit of the unwinding and winding of film (33) in substantially the same space.

Referring to Fig. 3, a slight change is made in the structure, shaft (28) and spool (40) having pulleys mounted thereon and carrying a driving belt (49); whereas in Fig. 4, the structure is the same excepting that shaft (28) and idler spool (44) have mounted thereon pulleys connected and driven by a belt (50). In Fig. 5 frame (27) is pivotally mounted and depends from shaft (28), and has formed thereon arms (51) having stationarily mounted therein the unwinding and winding spools (52) and (53), one of said spools in this case (53) carrying a pulley to receive a driving belt (54). In Fig. 6 of the drawings both unwinding spool (55) and winding spool (56) are stationary or rigid in the frame or wall of magazine (1), and have mounted on their studs (57) pulleys carrying a crossed belt drive (58) obviating in this instance the use of feeding and compensating rolls and excess or added actuating means; and in Fig. 7 a stationary frame (59) is mounted in magazine (1) having rigidly mounted therein unwinding spool (60) and winding spool (61), spaced apart sufficiently to permit of the unreeling of all of the film from one spool to the other in substantially the same space, each of said spools carrying pulleys having mounted thereon a drive belt (62) and guide rolls (63) and (64) mounted on magazine (1) over which the film passes during the unreeling and reeling thereof.

It is obvious that the device as herein shown and described may be arranged to operate in numerous ways and the same may be limited and enlarged in other ways without departing from the spirit of the invention.

What is claimed and what is desired by United States Letters Patent is:

1. A device of the character described comprising a magazine, a frame pivotally mounted therein, spools mounted in said frame, a supporting idler spool, a film mounted on said spools, a feeding roll, compensating rolls, a film mounted on said spools and engaging said rolls, and means permitting the unwinding and winding of said film on said spools within the same space displaced by the spool carrying the body of said film.

2. A device of the character described comprising a reception magazine, a supporting frame mounted in and movable within said magazine, spools mounted in said frame, a feeding roll, tension rolls, a film carried by one of said spools engaging said feeding and said tension rolls, an idler spool, means for driving said feeding roll, means for driving said spools, and means permitting the unwinding and winding of said film on said spools by the engagement of the periphery of the body roll of said film with said winding spool and of the engagement of said film with said idler spool, means for driving the spools carried by said frame, and means for actuating said feeding roll to unwind and wind said film on said spools, the passage of said film from one spool to the other thereof being in substantially the reception area of said magazine.

3. A device of the character described comprising a reception magazine, a supporting frame mounted in and movable within said magazine, spools mounted in said frame, a feeding roll, tension rolls, a film carried by one of said spools engaging said feeding and said tension rolls, an idler spool, means for driving said feeding roll, means for driving said spools, and means permitting the unwinding and winding of said film on said spools by the engagement of the periphery of the body roll of said film with said winding spool and of the engagement of said film with said idler spool, means for driving the spools carried by said frame, and means for actuating said feeding roll to unwind and wind said film on said spools, the passage of said film from one spool to the other thereof being in substantially the reception area of said magazine, by the means of the movement of said frame in said magazine and the movement of one of said spools in said frame.

4. A device of the character described comprising a reception magazine, a supporting frame pivotally mounted therein, winding and unwinding spools mounted in said frame, a feeding roll, compensating rolls, an idler supporting spool, a film mounted on said winding and unwinding spools, all of said spools and rolls being in direct alinement with one another.

5. A device of the character described comprising a magazine, a frame movably mounted therein, a film winding and unwinding means mounted in said frame, a film feeding means, a film tension means, a film winding supporting means, means for actuating said feeding means, means for actuating said winding and unwinding means from said feeding means, and means permitting the winding and unwinding of said film in the space required by a single film roll, by means of the movement of said frame in said magazine and the movement of unwinding means in said frame.

6. A device of the character described comprising a magazine, a frame pivotally mounted therein, spools mounted in said frame, a feeding roll, compensating rolls, a film mounted on said spools and engaging said rolls, and means permitting the unwinding and winding of said film on said spools within the space displaced by the spool carrying the body of said film in combination with means for feeding said film.

and means for actuating said film feeding means.

7. A device of the character described comprising a reception magazine, a frame pivotally mounted therein and movable with relation thereto, a series of spools mounted in said frame in alinement with each other, and a film carried by one of said spools adapted to be wound on the other of said spools within the same space required by said first-mentioned spool carrying the body of said film in combination with an auxiliary casing fastened to said magazine and having mounted therein mechanism for feeding said film.

8. A device of the character described comprising a magazine, means pivotally mounted therein, film spools mounted upon said means, a supporting roll for said means, a film mounted upon said spools, a feeding roll for said film, and means for holding the said film in engagement with said feeding roll, said pivotal means permitting the winding and unwinding of said film upon said spools within substantially the same space as is displaced by the spool carrying practically the entire body of the film.

In testimony whereof I have hereunto signed my name in the presence of two subscribing witnesses.

WILLIAM M. THOMAS.

In the presence of:
E. E. HAINES,
W. J. LLEWELLYN.